United States Patent
Chiu et al.

(10) Patent No.: US 7,200,117 B2
(45) Date of Patent: Apr. 3, 2007

(54) METHOD OF OPTIMIZING NETWORK CAPACITY AND FAULT TOLERANCE IN DEADLOCK-FREE ROUTING

(75) Inventors: Dah Ming Chiu, Acton, MA (US); Miriam C. Kadansky, Westford, MA (US); Murat Yuksel, Troy, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 952 days.

(21) Appl. No.: 10/066,430

(22) Filed: Jan. 31, 2002

(65) Prior Publication Data

US 2003/0142627 A1    Jul. 31, 2003

(51) Int. Cl.
*H04L 12/26*    (2006.01)
(52) U.S. Cl. ............... 370/238; 370/252; 370/395.31; 370/400; 709/239; 709/242
(58) Field of Classification Search ............. 370/227, 370/395.31
See application file for complete search history.

(56) References Cited

U.S. PATENT DOCUMENTS

| | | | |
|---|---|---|---|
| 5,453,978 A | 9/1995 | Sethu et al. | |
| 5,491,690 A | 2/1996 | Alfonsi et al. | |
| 5,732,072 A | 3/1998 | Thanner et al. | |
| 6,047,331 A | 4/2000 | Medard et al. | |
| 6,285,951 B1 * | 9/2001 | Gaskins et al. | 701/209 |
| 6,466,779 B1 | 10/2002 | Moles et al. | |
| 6,631,421 B1 | 10/2003 | Steele et al. | |
| 6,647,427 B1 | 11/2003 | Watanabe | |
| 6,658,481 B1 | 12/2003 | Basso et al. | |
| 6,678,241 B1 | 1/2004 | Gai et al. | |
| 6,711,623 B1 | 3/2004 | Furukawa et al. | |
| 6,765,880 B1 | 7/2004 | Hillard et al. | |
| 6,826,195 B1 * | 11/2004 | Nikolich et al. | 370/465 |
| 6,944,131 B2 * | 9/2005 | Beshai et al. | 370/238.1 |
| 2002/0042274 A1 | 4/2002 | Ades | |
| 2002/0073338 A1 | 6/2002 | Burrows et al. | |
| 2002/0141346 A1 | 10/2002 | Garcia-Luna-Aceves et al. | |
| 2003/0028852 A1 * | 2/2003 | Thurman et al. | 716/12 |
| 2003/0101278 A1 * | 5/2003 | Garcia-Luna-Aceves et al. | 709/240 |
| 2003/0126246 A1 * | 7/2003 | Blouin et al. | 709/223 |
| 2003/0140165 A1 | 7/2003 | Chiu et al. | |
| 2003/0172180 A1 | 9/2003 | Reynders et al. | |

* cited by examiner

*Primary Examiner*—Huy D. Vu
*Assistant Examiner*—Roberta A Shand
(74) *Attorney, Agent, or Firm*—Chapin IP Law, LLC; Barry W. Chapin, Esq.

(57) ABSTRACT

A system for selecting routing information from a routing table describing alternative routes between end nodes. The routing table represents a set of minimum cost, deadlock-free routes between end nodes. The selected routing information is included in forwarding tables, and sent to networking devices in the network. The selected routing information is optimized for at least one network performance metric, such as overall network capacity or fault tolerance. Capacity optimization is obtained by selecting from alternative routes stored within the routing table such that the standard deviation of the number of routes flowing over each link in the network is minimized. Fault tolerance optimization is achieved by selecting from the alternative routes stored in the routing table such that the selected route for a given end node pair has a "failover" route with a maximum number of dissimilar links from the selected route.

12 Claims, 8 Drawing Sheets

METHOD OF OPTIMIZING NETWORK CAPACITY AND FAULT TOLERANCE IN DEADLOCK-FREE ROUTING

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to routing of data units through a communication network, and more specifically to a system for optimizing network-wide performance metrics when selecting from alternative routes within a deadlock-free set of minimum cost routes.

Routing is the process of determining the network links over which data, such as a packet or other specific type of data unit, is forwarded on its way through a network. Routing is performed by various kinds of data forwarding devices, sometimes referred to as routers and/or switches. A forwarding device that performs routing is typically connected to multiple communication links, and operates to select at least one of those communication links as an output link for each received data unit to be forwarded.

The series of network links between forwarding devices over which data units for a given destination are forwarded from an initial forwarding device to a final forwarding device is referred to as a "route" through a network. Traditional routing systems have generated routing information describing routes through a network that contain no loops. However, even where loop-free routes have been determined, network traffic flows can interact with each other to cause a problem known as "deadlock.". For example, deadlock can occur within a group of switches, each of which has buffers full of data, and cannot drop any packet from those buffers. Each of the switches in the group may be unable to forward its received data because the next forwarding device to which the data must be forwarded also has no available buffers in which to store the data.

In order to avoid deadlock, existing routing systems have been developed which provide deadlock-free sets of routes by either constraining the topology of the network itself, and/or by constraining the routes which may be taken through the network. For example, the topology of a network may be constrained such that the devices in the network are arranged as a grid. Given a grid topology, if all routes through the network are required to first traverse links horizontally as far as necessary, then vertically to the destination node, the network will be deadlock-free. Similarly, if a network topology is constrained to be a tree, which by definition includes no loops, that network will also be deadlock-free.

In a centralized approach to route generation for a network, a central forwarding device first obtains the complete topology of the network, for example by having each other forwarding device in the network report the neighbor nodes to which it is connected. The central forwarding device then calculates a deadlock-free set of minimum cost routes for the whole network, and stores routing information describing that set of routes within a routing table. Once computed, the routing information can be distributed as forwarding tables to all other forwarding devices in the network, thus informing each forwarding device of the neighbor device to which each received data unit is to be forwarded to, based on the destination of the received data unit.

One existing approach to determining a deadlock-free set of routes through a network is known as "up/down routing." In up/down routing, one of the forwarding devices in the network is chosen arbitrarily as the root node of a spanning tree for the network. All links within the network are then designated as "up" or "down" links with respect to the root node. The determination of an "up" or "down" state for a given link is based on the position of the link within the spanning tree. A link is "up" if it points from a lower to a higher level node in the tree. Otherwise, the link is considered a "down" link. For nodes at the same level, node IDs are used to break the tie. Routing of packets is performed such that any "up" links (towards the root) in the route are traversed before any "down" links are traversed (away from the root node) in order to reach the destination. Accordingly, once a "down" link has been traversed, no "up" links may be used within that route. This approach is one example of the various existing systems for producing sets of routes that are deadlock-free.

When the set of routes for a network is described by routing information stored in a centrally located routing table, that table may include information describing a number of alternative routes. Some existing systems have randomly selected from alternative routes stored in a central routing table prior to delivering routing information to individual devices. With such centralized selection, the individual forwarding devices in the network are sent forwarding tables that include forwarding information describing only the selected routes. Accordingly, individual forwarding devices such as switches within the network have no opportunity to perform load balancing across alternative routes in order to improve capacity.

In other existing systems, load balancing is addressed by distributing forwarding information that describes alternative routes. After receiving a forwarding table that includes such alternative route information, a forwarding device such as a switch may then independently distribute traffic across the alternative routes to provide load balancing. However, such distributed load balancing, performed independently by individual forwarding devices, is often constrained in its effectiveness by the limited information employed by each forwarding device when selecting between alternative routes. For example, a forwarding device in such a system may perform load balancing across alternative links in response to transmit queue depths for each of its various output ports. Such operation may not provide optimal load balancing on a network wide basis. Moreover, the above described existing systems typically do not perform any optimization with regard to fault tolerance when selecting from alternative routes.

These shortcomings are particularly important in many contemporary high-speed networks, in which performance goals such as optimizing traffic capacity and providing fault tolerance on a network wide basis are very significant. Accordingly, it would be desirable to have a system for selecting between alternative routes, prior to providing routing information from a forwarding table to forwarding devices in a network, that optimizes the selection between alternative routes based on significant network wide performance characteristics, such as traffic capacity and fault tolerance.

BRIEF SUMMARY OF THE INVENTION

In accordance with principles of the invention, a system for selecting routing information to be provided to devices in a communication network is disclosed. In the disclosed system, a routing table is used to store routing information describing a deadlock-free set of alternative, minimum cost routes between end nodes within the network. The disclosed system operates to select and deliver forwarding information, for example in the form of forwarding tables, to a number of forwarding devices such as switches. The distributed forwarding information is selected from alternative routes within the routing table, in a way that optimizes for at least one network-wide performance metric. Performance metrics optimized in this way may include network-wide capacity and/or fault tolerance. In order to optimize for network-wide capacity, the disclosed system selects from alternative routes stored in the routing table such that the standard deviation of the number of routes flowing over each link in the selected set of routes is minimized. When optimizing for fault tolerance, the disclosed system operates to select routes from alternative routes in the routing table that have a maximum difference with respect to at least one other alternative route. The maximized difference may be calculated in terms of the number of dissimilar links between a selected route and at least one alternative route. In this way, should a failure occur, the probability of being able to successfully switch over to the unselected (or "failover") alternative route, in the face of failure of one or more links in the selected route, is improved.

BRIEF DESCRIPTION OF THE SEVERAL VIEWS OF THE DRAWINGS

The invention will be more fully understood by reference to the following detailed description of the invention in conjunction with the drawings, of which.

DETAILED DESCRIPTION OF THE INVENTION

Figure 1:
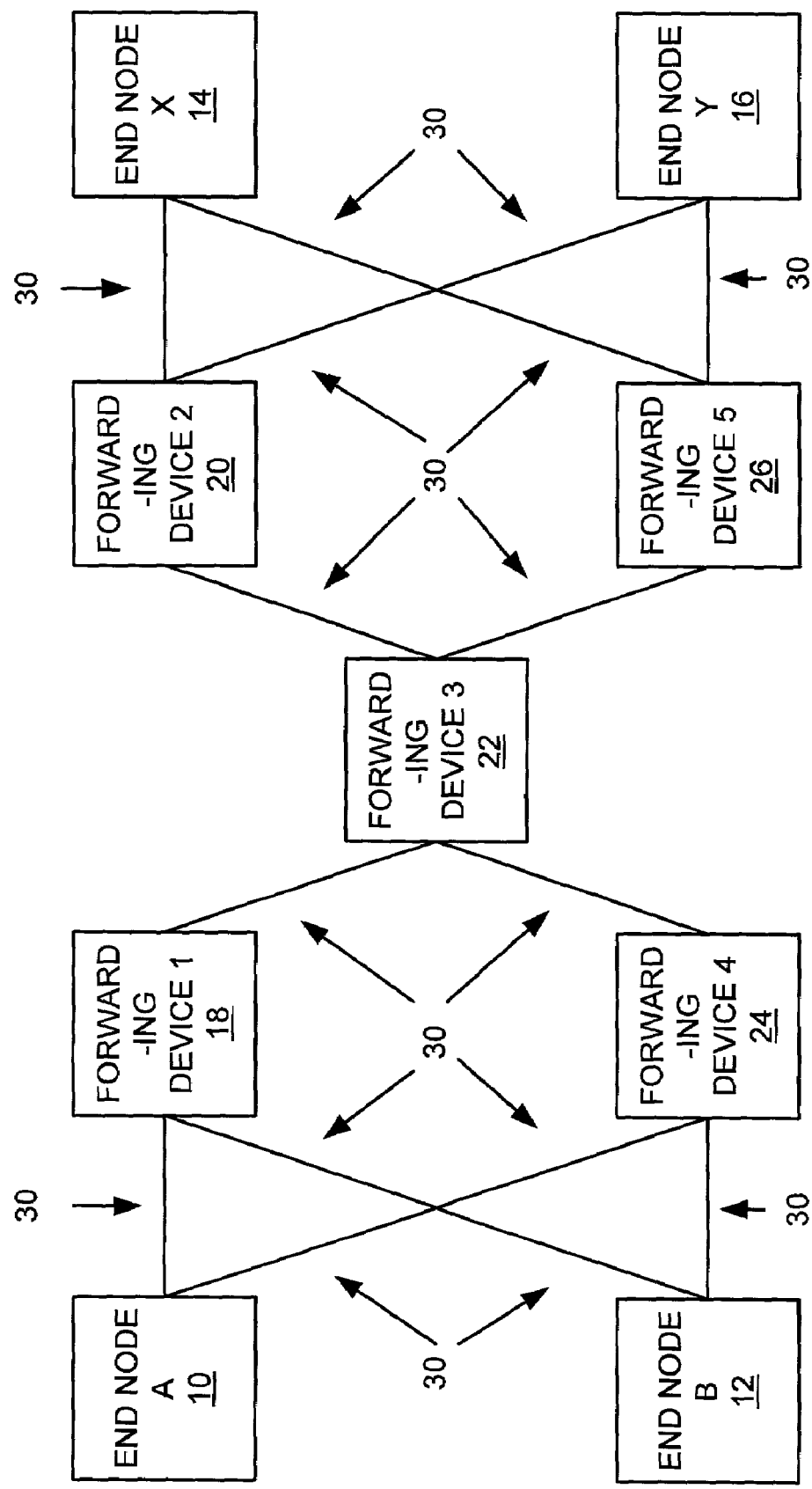
FIG. 1 shows an illustrative network of devices for which routes are provided by an embodiment of the disclosed system.

The disclosed system involves generation of routing information for a network of devices, such as the network of devices shown in FIG. 1. FIG. 1 shows a communication network including a number of end nodes, shown as end node A 10, end node B 12, end node X 14, and end node Y 16. The end nodes in FIG. 1 communicate with one another through a number of forwarding devices, such as switches, shown as forwarding device 1 18, forwarding device 2 20, forwarding device 3 22, forwarding device 4 24, and forwarding device 5 26. The links interconnecting the devices shown in FIG. 1 may consist of any appropriate type of communications media, including fiber optic or other media. Each of the devices shown in FIG. 1 may include one or more processors for executing program code stored within a program code memory, and/or hardware logic providing specific functionality.

Figure 2:
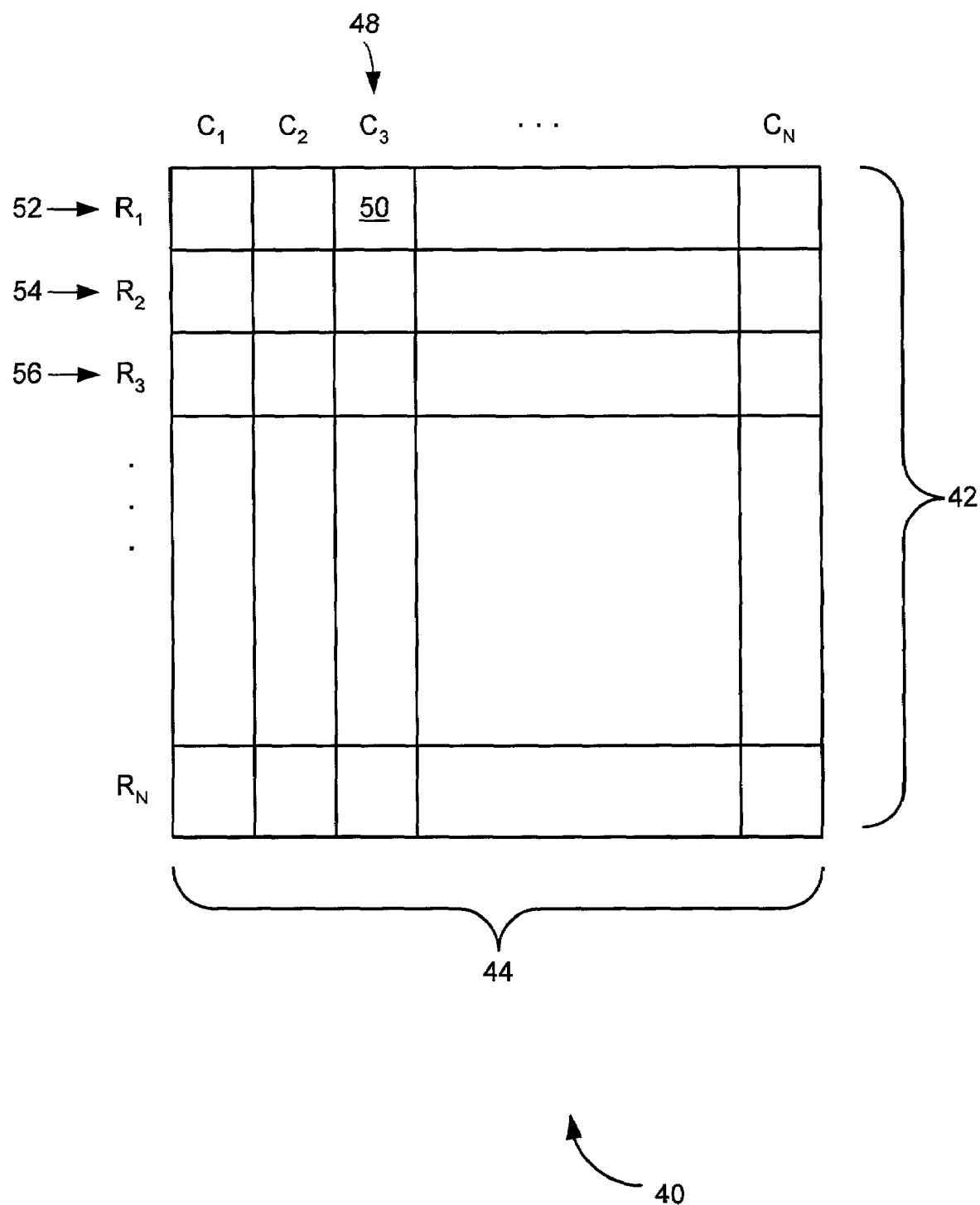
FIG. 2 shows an example of a routing table.

During operation of the devices shown in FIG. 1, a routing table representing a deadlock-free set of minimum cost routes is generated and processed. An example of a routing table 40 is shown in FIG. 2. As shown in FIG. 2, the routing table 40 includes a number of rows 42 and a number of columns 44. Each of the rows 42 contains next hop forwarding information for a corresponding forwarding device in a network. The routing table 40 includes routing information for N forwarding devices. For example, the row indices for the routing table 40 may be associated with forwarding devices making a forwarding decision regarding one or more data units, and the column indices for the routing table 10 are associated with the end node devices to which those data units are addressed and ultimately delivered.

Information within a routing table entry having indices Row_Index and Column_Index describes how a forwarding device associated with Row_Index should forward a data unit addressed to a destination end node associated with Column_Index. For example, considering the illustrative network of FIG. 1, row $R_1$ 52 could store forwarding information to be used by forwarding device 1 18. Accordingly, each entry in row $R_1$ 52 would contain forwarding information to be used when forwarding data units received by forwarding device 1 18. Data units received by forwarding device 1 18 and having a destination address indicating end node A 10, would be forwarded by forwarding device 1 18 based on forwarding information contained in a forwarding table entry located using a column index corresponding to end node A 10, shown for purposes of illustration as column index $C_3$ 48. As a result, forwarding device 1 18 would reference the forwarding information contained in the routing table entry 50. Such forwarding information would indicate an outgoing link from forwarding device 18 onto which the received data unit should be forwarded, and any other information necessary to forward the data unit. Multiple, minimum cost routes described by the routing table 40 may be represented by the inclusion of information describing alternative outgoing links within the entries of the routing table 40. During operation of the present system, the contents of the routing table 40 are used to generate forwarding tables that are sent to the associated devices within the network. The forwarding tables generated by the disclosed system reflect selection of routes from alternative routes described in the routing table 40 by the disclosed system. Each resulting forwarding table provides the routing information needed by the corresponding node to forward the data units it receives. In the illustrative embodiment, each row within the routing table 40 serves as a forwarding table for its corresponding node, providing the routing information needed by that node to forward the data units it receives. As illustrated in FIG. 2, row $R_1$ 52 would therefore be forwarded to node 1, to serve as the forwarding table for forwarding device 1 18 as shown in FIG. 1.

For purposes of explanation, the term "routing" shall be used to refer to a set of routes for which there exists only one route for a given destination end node between an initial forwarding device and a final forwarding device. In other words, a routing is a set of routes that includes no alternative routes.

Accordingly, at any given time, the routing table 40 describes one "enabled routing", plus a number of alternative routes that may be substituted for routes in the enabled routing to generate alternative routings. When the disclosed system determines that an alternative routing is more optimal than the current enabled routing, then that alternative routing becomes the enabled routing. The forwarding tables distributed to devices in the network reflect a final enabled routing described by the forwarding table 40 following optimization for at least one predetermined, network-wide performance metric as further described below. Accordingly, the distributed forwarding tables include no alternative routes, thus simplifying operation of the forwarding devices when making forwarding decisions.

Figure 3:
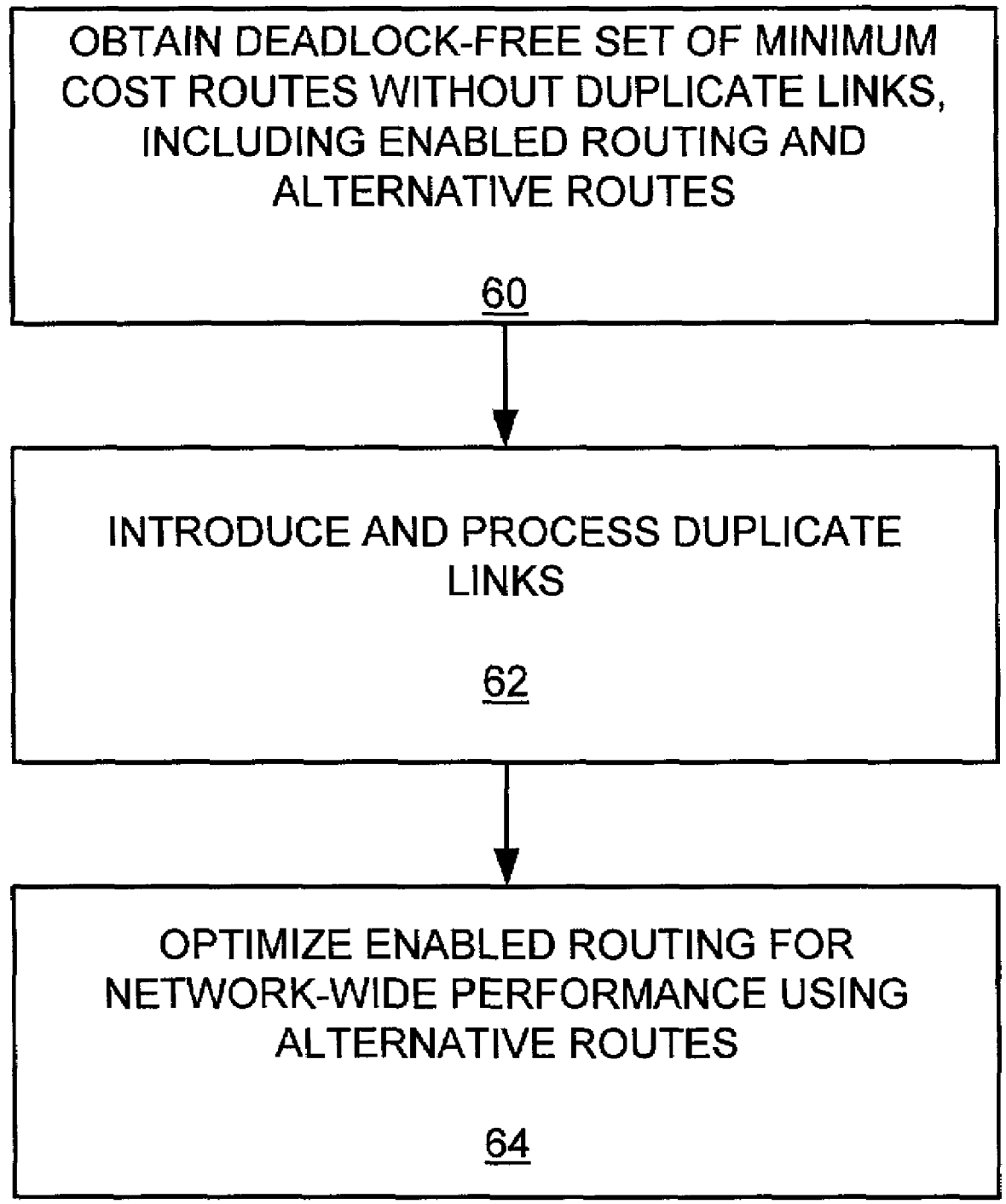
FIG. 3 is a flow chart showing steps performed in an illustrative embodiment.

FIG. 3 illustrates an embodiment of the disclosed system that optimizes for network capacity. As shown in FIG. 3, at step 60, a routing table storing routing information describing a deadlock-free set of minimum cost routes, including an enabled routing and a number of alternative routes. Step 60 may be embodied to obtain routing information from any routing algorithm that generates a deadlock free set of minimum cost routes. The routing table obtained at step 60 may, for example, be in the format of the routing table 40 shown in FIG. 2.

In the case where there are duplicate links between forwarding devices in the network topology, such links can be removed before generating the set of routes obtained at step 60, in order to reduce complexity. Such duplicate links can then simply be re-introduced and processed for purposes of load balancing in step 62. Advantageously, during step 62, duplicate links may then be exploited for load-balancing.

For purposes of explanation, each network link shall have two "end-points" consisting of the forwarding devices that it connects. For example, in the case where there exists two links connecting a forwarding device 1 and a forwarding device 2, then those duplicate links would have end points of forwarding device 1 and forwarding device 2. The term "flow" shall be used herein to refer to network traffic passed between a unique pair of end nodes. Accordingly, in a network including n end nodes, there would be n*(n−1) flows resulting from each end node being used as a source and as a destination.

Figure 4:
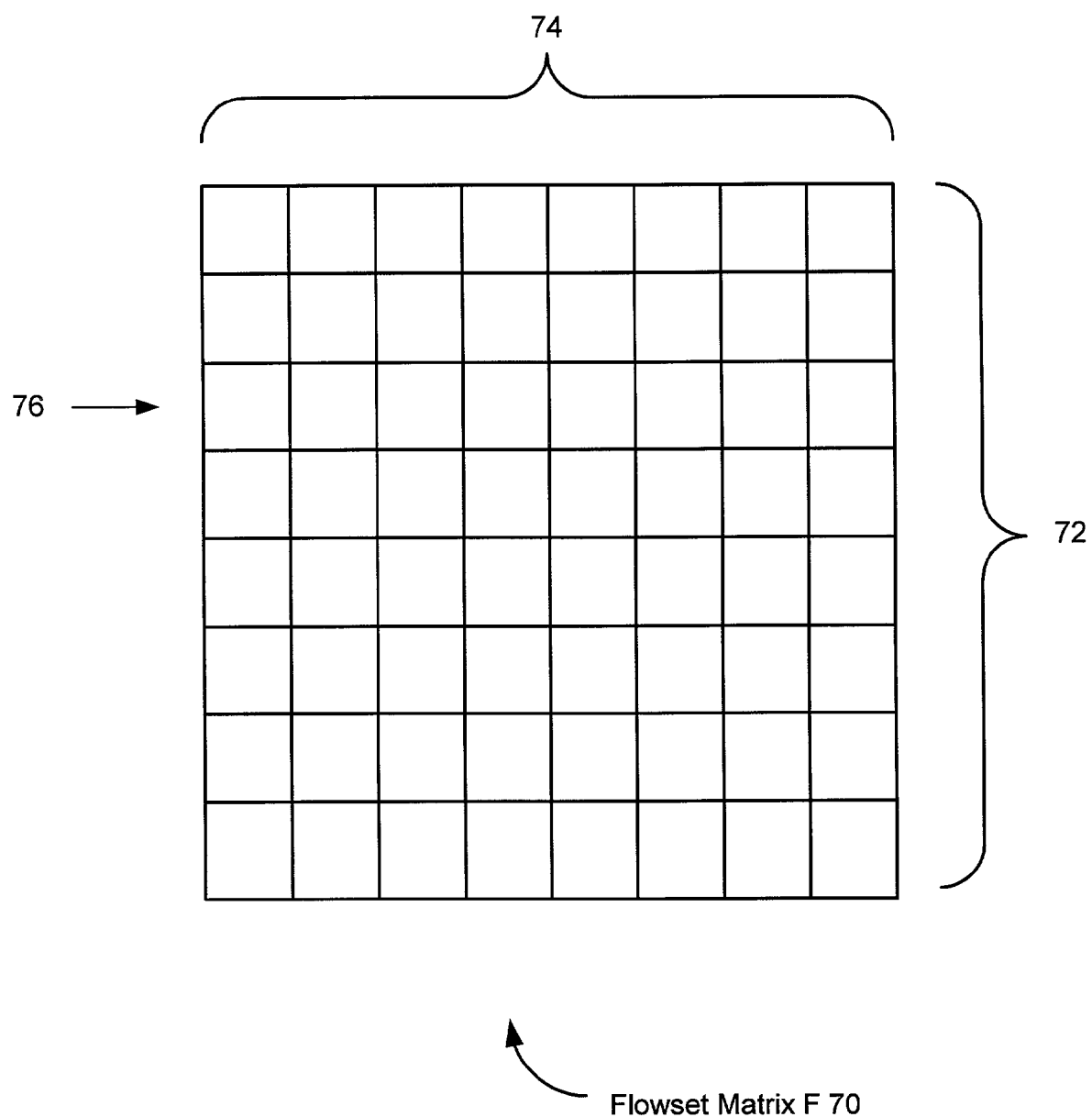
FIG. 4 shows an example of a flow matrix.

In step 62, duplicate links are reintroduced and used to load-balance different flows going through the end-points of the duplicate links. The "flowset from forwarding device i to end node k", $f\_i(k)$, is a value equal to the number of flows passing through a forwarding device i and destined to an end node k. The "flowset vector of forwarding device i", $f\_i$, is a vector of flowsets, the kth element of which is the flowset from forwarding device i to end node k. For a given network and routing table, at step 62 the illustrative embodiment organizes the flowsets for the enabled routing into a flowset matrix, such as the flowset matrix F 70 shown in FIG. 4. The rows 72 of the flowset matrix F 70 are the flowset vectors associated with the forwarding devices of the network. The columns 74 of the flowset matrix F 70 correspond to the end nodes of the network. The flowset matrix F 70 of FIG. 4 is therefore a matrix in which the ith row is the flowset vector $f\_i$ 76.

In order to perform load balancing across the duplicate links at step 62, the disclosed system employs the flow matrix F 70. For example, changing the kth element of the forwarding table for forwarding device i causes all the flows going to end node k through node i to go through a new link. Accordingly, the load of that new link will be increased by the value of $f\_i(k)$, and the load of the previous link will be decreased by the value of $f\_i(k)$. With this consideration, in order to distribute routes among duplicate links of two neighboring forwarding devices i and j, and assuming the flows to end node k traverse a link between forwarding device i and forwarding device j, the disclosed system operates to distribute routes represented by the flowsets $f\_i(k)$ and $f\_j(k)$ among the duplicate links such that the total loads on the duplicate links are as even as possible.

Figure 5:
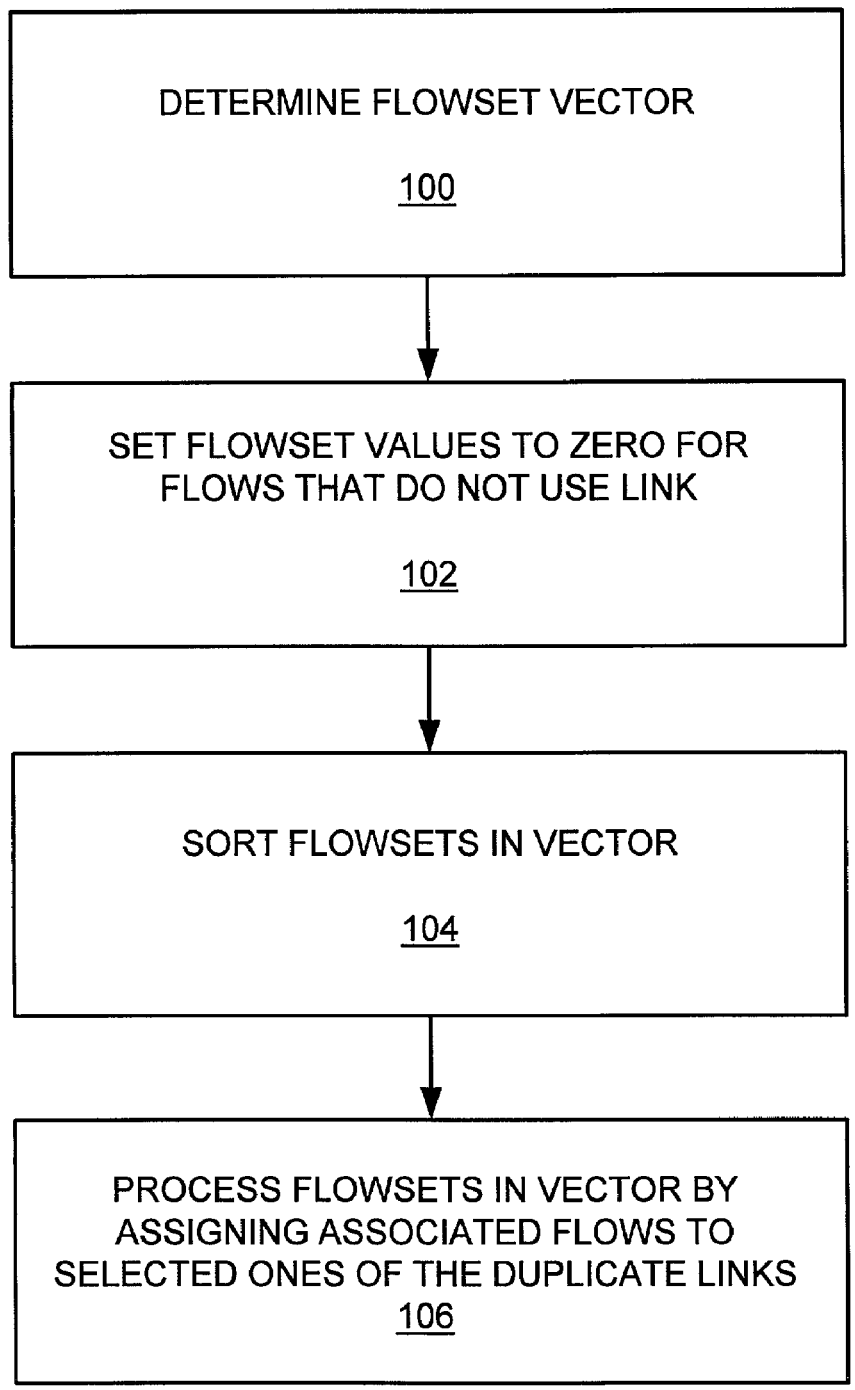
FIG. 5 shows steps performed to process duplicate uni-directional links.

The disclosed system may be embodied to perform load balancing across duplicate unidirectional and/or bi-directional links. The disclosed system performs load balancing across unidirectional links by performing the series of steps illustrated in FIG. 5 for each pair of neighboring forwarding devices i and j that are connected by multiple links. At step 100, the disclosed system determines a flowset vector $f\_i$. At step 102, the flowsets $f\_i(k)$ corresponding to flows that do not use a unidirectional link from forwarding device i to forwarding device j are set to zero values. Next, at step 104, the flowsets of $f\_i$ are sorted in descending order. The sorted flowset vector $f\_i$ is then processed at step 106 by repeating the following steps until all the flowsets in the vector have been processed: a) assign the flows associated with the end node for the first (largest) flowset value of the flowset vector $f\_i$ to the unidirectional link from forwarding device i to forwarding device j which currently has the smallest load; b) remove the first element from flowset vector $f\_i$, and return to step a).

Figure 6:
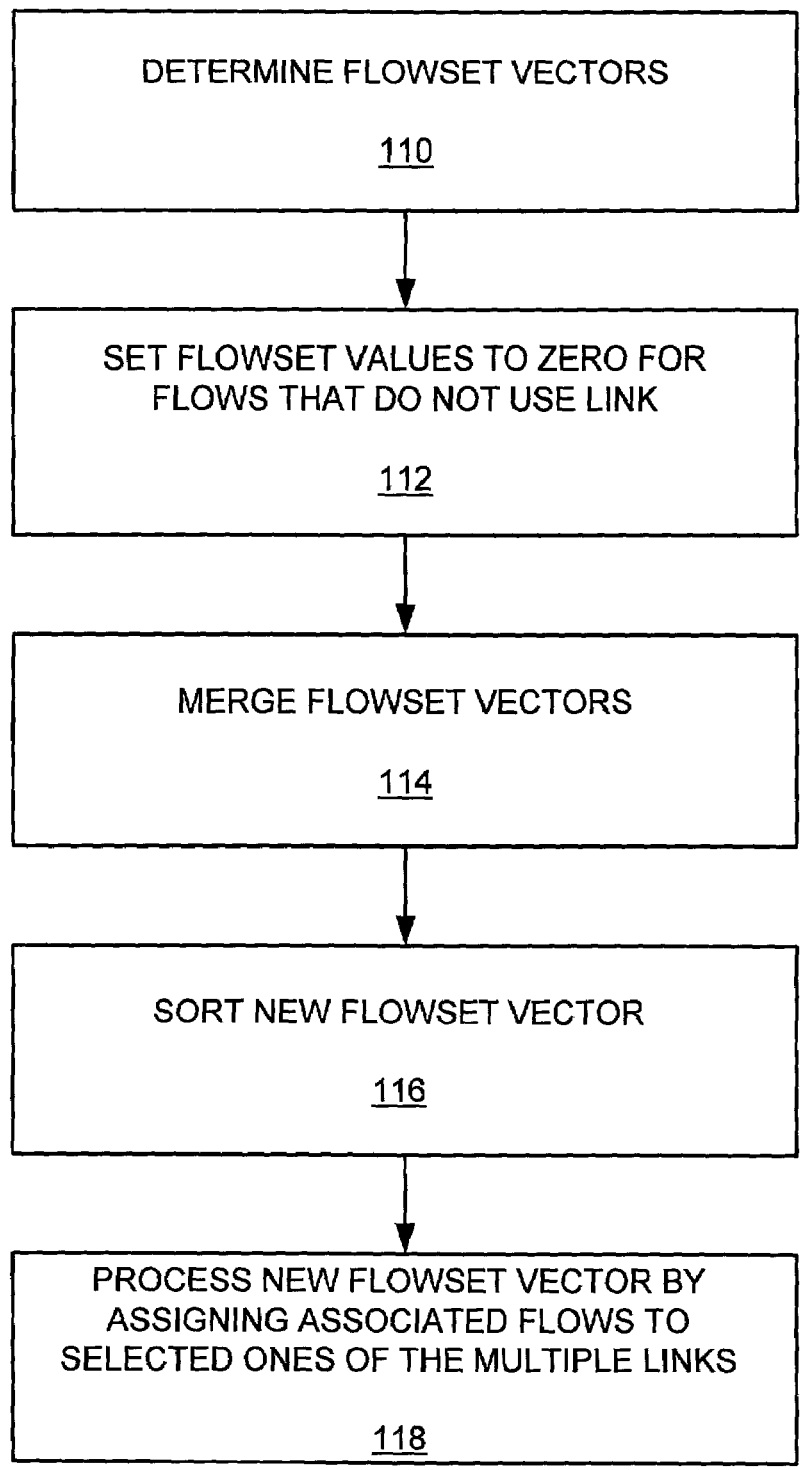
FIG. 6 shows steps performed to process duplicate bi-directional links.

FIG. 6 shows an alternative embodiment that can be used at step 62 of FIG. 3 to process duplicate bi-directional links. The steps in FIG. 3 are performed for all neighboring forwarding devices i and j that are connected with multiple links. At step 110, the disclosed system calculates the flowset vectors $f\_i$ and $f\_j$. Next, at step 112, the disclosed system sets flowset values for $f\_i(k)$ and $f\_j(k)$ to zero if the corresponding flowsets do not use the link between forwarding devices i and j. The flowset vectors $f\_i$ and $f\_j$ are then merged into a single new vector $f\_new$ at step 114, and all the elements in the new flowset vector $f\_new$ are then sorted in descending order at step 116. The sorted flowset vector $f\_new$ is then processed at step 118 by repeating the following steps until all the flowsets in the vector have been processed: a) assign the flows associated with the end node for the first (largest) flowset value of the flowset vector $f\_new$ to the link between forwarding elements i and j which currently has the smallest load; b) remove the first element from flowset vector $f\_new$, and return to step a).

Again with reference to FIG. 3, at step 64, the illustrative embodiment optimizes for network-wide capacity by substituting alternative routes into the enabled routing to determine network capacities associated with the resulting alternative routings. Network capacity for each alternative routing is computed to reflect the distribution of flows across links in the network. To determine a network capacity for a given alternative routing, a utilization level for each link is determined equal to the number of flows passing over that link when using that routing. On this basis, the disclosed system determines an average link utilization and the standard deviation of link utilization for the network. A routing associated with a lower standard deviation of link utilization is considered to have a higher network capacity. In other words, when alternative routings are compared to a current enabled routing, the routing associated with a smaller standard deviation is considered to provide the higher capacity of the pair. An alternative route resulting in a routing having a relatively higher network capacity is selected at step 64 over a route in the enabled routing resulting in a relatively lower network capacity.

Figure 7:
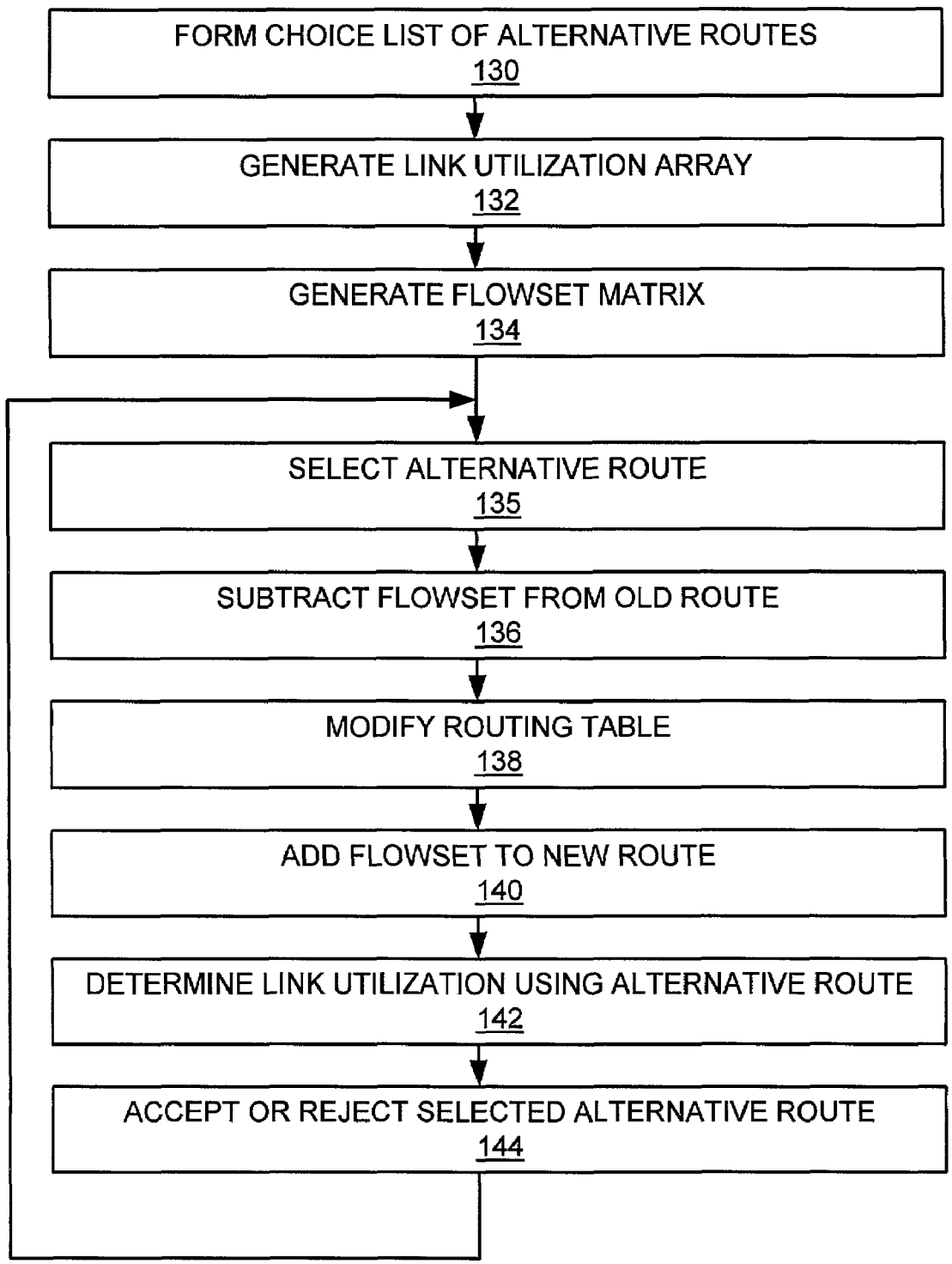
FIG. 7 shows steps performed to perform network capacity optimization in an illustrative embodiment.

As shown by the steps in FIG. 7, step 64 of FIG. 3 may be implemented using a hill-climbing algorithm. At step 130, the alternative routes in the routing table are stored in a choice-list. Then, at step 132, the disclosed system generates an array of link utilizations for the enabled routing, LU. The array LU is indexed by link number, such that the element LU(link_num) contains the number of flows passing over a link designated by link_num using the enabled routing. At step 134, the disclosed system generates a flowset matrix, F for the enabled routing. Steps 135 through 144 are then repeated until no improvement in the standard deviation of link usage is found for N consecutive iterations, where N is a configurable parameter.

At step 135, the disclosed system selects an alternative route from the choice-list. The selection at step 135 may be made in one of several ways. For example, an alternative route may be selected at random from the choice-list. In another approach, an alternative route may be selected at step 135 that has a minimum number of links in common with the corresponding route in the enabled routing. Still another technique that may be applied in the selection at step 135 would be to select an alternative route having links with very low current utilization as indicated by the corresponding values in LU. For purposes of illustration, a selected alternative route is considered that modifies the kth element of a forwarding table (row in the routing table) for a forwarding device i to indicate a new link l_alt to forwarding device fd_alt, that is to be used when forwarding data units destined for an end node k. Further for purposes of illustration, in the current enabled routing, the kth element of the forwarding table for forwarding device i indicated that data units destined to end node k were to be forwarded over link l_current to forwarding device fd_current.

At step 136, the disclosed system subtracts the value of F(i,k) in the flowset matrix F from LU(l_current) and F(fd_current,k). At step 138, the enabled routing in the routing table is modified to reflect use of the alternative route l_alt when forwarding data units destined for end node k from forwarding device i. Then, at step 140, the disclosed system adds the value of F(i,k) to LU(l_alt) and F(fd_alt,k). The standard deviation of link utilization is then calculated at step 142 based on the contents of the modified array LU. At step 144, if the standard deviation of link utilization using the selected alternative route is less than the standard deviation of link utilization using the previous, enabled routing, then the alternative route selected at step 175 is accepted, and the choice-list is updated by removing the selected alternative route and adding the previous route from the enabled routing. Otherwise, the selected alternative route is rejected, and the operations on LU, F and the routing table based on the alternative route are undone.

Instead of optimizing for network capacity at step 64 of FIG. 3, the disclosed system may operate to optimize for network wide fault tolerance by selecting from the alternative routes obtained at step 60. Using the network shown in FIG. 1 as an example, the disclosed system might consider the following alternative routes between end node B 12 and end node Y 16 during step 64:

Alternative Route 1 : end node B->forwarding device 1->forwarding device 3->forwarding device 2->end node Y.

Alternative Route 2 : end node B forwarding device 1->forwarding device 3->forwarding device 5->end node Y.

Alternative Route 3 : end node B->forwarding device 4->forwarding device 3->forwarding device 2->end node Y.

Alternative Route 4 : end node B forwarding device 4->forwarding device 3->forwarding device 5->end node Y.

The disclosed system would operate to select from the above alternative routes to maximize the number of dissimilar links between the selected route and at least one of the remaining routes, which would be stored as a backup route. Accordingly, the disclosed system would determine that Alternative Route 1 and Alternative Route 4 have the most dissimilar links of any pair of the above alternative routes. The disclosed system may then select either Alternative Route 1 or Alternative Route 4 for inclusion in the enabled routing represented by the routing table, based on any appropriate criteria, or randomly. The other one of Alternative Route 1 or Alternative Route 4 would then be stored as a backup route. Upon detection of a failure of the selected route, the backup route could then be selected as a current route between the end nodes, with a relatively higher likelihood that the original failure would not be duplicated.

The disclosed system may operate to optimize network wide fault tolerance by comparing the fault tolerance of alternative routings. To do so, the disclosed system first determines the fault tolerance of each route in the routing as a percentage of dissimilar links between a selected route and at least one back up route. Where there are no backup routes for a given route, then the fault tolerance for that route would be zero. The fault tolerance for a given routing may then be determined as the average fault tolerance across all routes in the routing. The disclosed system then operates to select a routing with a higher network wide fault tolerance over a routing having a relatively lower network wide fault tolerance as the enabled routing in the routing table to be used as a basis for the distributed forwarding tables.

Figure 8:
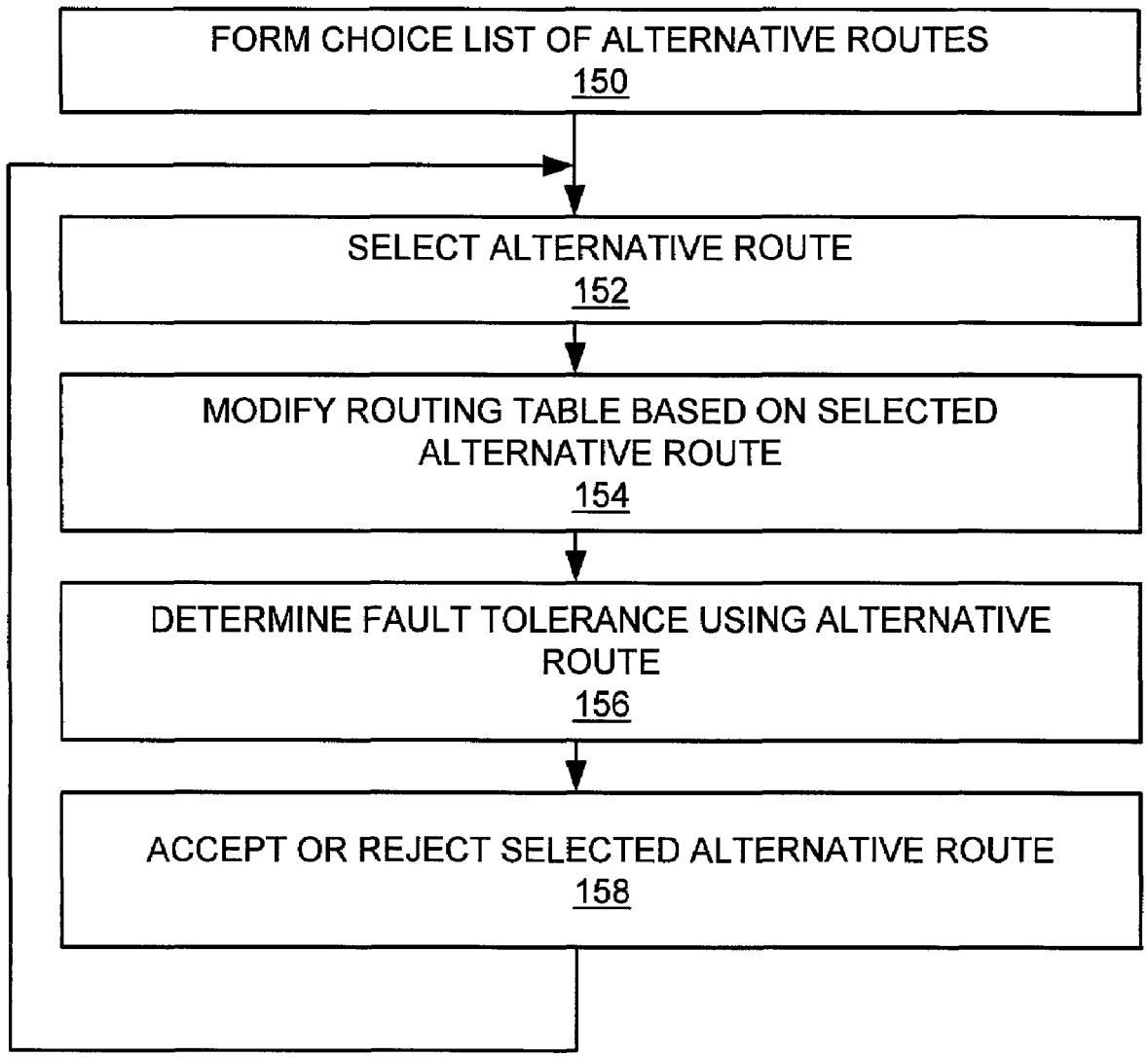
FIG. 8 shows steps performed to perform network fault tolerance optimization in an illustrative embodiment.

FIG. 8 shows steps performed in an illustrative embodiment to optimize for network wide fault tolerance. At step 150 the alternative routes in the routing table are used to form alternative routings that are stored in a choice list. Steps 152 through 158 are then repeated until no improvement is found to the fault tolerance of the network for N consecutive iterations, where N is a configurable parameter.

At step 152, the disclosed system selects an alternative route from the choice-list. The selection at step 152 may be made in one of several ways. For example, an alternative route may be selected at random from the choice-list. In another approach, an alternative route may be selected at step 152 that has a minimum number of links in common with the corresponding route in the enabled routing. Still another technique that may be applied in the selection at step 152 would be to select an alternative route having links with very low current utilization as indicated by the corresponding values in a utilization array LU as described above with reference to FIG. 7.

At step 154, the routing table is modified to indicate that the alternative route selected at step 152 is part of the enabled routing. The fault tolerance of the network using the alternative route selected at step 152 is then determined at step 156 by first determining the fault tolerance of each route in the new enabled routing as a percentage of dissimilar links between the enabled route and at least one back up route, such that where there are no backup routes for a given enabled route, the fault tolerance for that route is zero. The network wide fault tolerance for the new enabled routing including the selected alternative route is then determined as the average fault tolerance across all routes in the new enabled routing. If the network wide fault tolerance is improved using the alternative route selected at step 152, then at 158 the selected alternative route remains in the enabled routing, and the choice list is updated by removing the selected alternative route and adding the corresponding route previously in the enabled routing. Otherwise, the selected alternative route is rejected, and the operations to modify the enabled routing in the routing table to reflect the selected alternative route are undone.

As described above, in the case of optimizing either network capacity or fault tolerance, the disclosed system may operate iteratively to determine more optimal routings until a limit N of unsuccessful attempts at improvement is reached. A large value of N tends to result in more optimal results, and a smaller value of N limits the time spent for the optimization. Other limits may also be used with respect to the optimization steps described herein. For example, the network capacity optimization described with reference to FIG. 7 may be embodied such that the steps 135 through 144 are repeated until a minimum fault tolerance for the network is reached or exceeded. Other limits may also or alternatively be used as appropriate for a given application.

Those skilled in the art should readily appreciate that programs defining the functions of the disclosed system and method can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

While the invention is described through the above exemplary embodiments, it will be understood by those of ordinary skill in the art that modification to and variation of the illustrated embodiments may be made without departing from the inventive concepts herein disclosed. In particular, while some of the illustrative embodiments are described in connection with the use of a table formatted routing table, the disclosed system and method are also applicable to any specific kind of routing table. Accordingly, the invention should not be viewed as limited except by the scope and spirit of the appended claims.

What is claimed is:

1. A method for selecting routing information to be provided to forwarding devices in a communication network, comprising:
   obtaining information describing a plurality of alternative routes between forwarding devices of said communication network from a single routing table, wherein said plurality of alternative routes is deadlock free;
   selecting a final enabled routing from said plurality of alternative routes, wherein said selecting optimizes a performance metric, wherein said Performance metric is network capacity, wherein selecting the final enabled routing further comprises:
      determining a first set of data flows between end nodes attached to said communication network, wherein said first set of data flows is determined, at least in part, responsive to a first one of said alternative routes;
      determining, responsive to said first set of data flows, a first standard deviation, wherein said first standard deviation describes a distribution of said first set of data flows across links in said communication network;
      determining a second set of data flows between end nodes attached to said communication network, wherein said second set of data flows is determined response to a second one of said alternative routes;
      determining, responsive to said second set of data flows, a second standard deviation, wherein said second standard deviation describes a distribution of said second set of data flows across links in said communication network;
      comparing said first standard deviation and said second standard deviation;
      selecting said first one of said alternative routes in the event that said first standard deviation is lower than said second standard deviation; and
      selecting said second one of said alternative routes in the event that said second standard deviation is lower than said first standard deviation; and
   delivering a forwarding table to each forwarding device in said communication network, the forwarding tables containing no alternative routes and causing the forwarding devices to implement the final enabled routing.

2. The method of claim 1, wherein said performance metric is fault tolerance.

3. The method of claim 2, wherein said step of selecting a final enabled routing comprises:
   determining a first difference measure, said first difference measure reflecting a number of differing links between a first pair of said alternative routes;
   determining a second difference measure, said second difference measure reflecting a number of differing links between a second pair of said alternative routes;
   comparing said first difference measure and said second difference measure;
   determining a selected pair of said alternative routes, wherein said selected pair of said alternative routes comprises said first pair of said alternative routes in the event said first difference measure is greater than said second difference measure, and wherein said selected pair of alternative routes comprises said second pair of alternative routes in the event said second difference measure is greater than said first difference measure; and
   designating a first one of said selected pair of said alternative routes as an enabled route, and designating a second one of said selected pair of said alternative routes as a backup route.

4. The method of claim 3, further comprising: detecting a failure of said enabled route; and
   replacing said enabled route with said backup route.

5. A system for selecting routing information to be provided to forwarding devices in a communication network, comprising routing logic operable to:
   obtain information describing a plurality of alternative routes between forwarding devices of said communication network from a single routing table, wherein said plurality of alternative routes is deadlock free;
   select a final enabled routing from said plurality of alternative routes, wherein said selecting optimizes a performance metric, wherein said performance metric is network capacity, wherein said routing logic is further operable to:
      determine a first set of data flows between end nodes attached to said communication network, wherein said first set of data flows is determined, at least in part, responsive to a first one of said alternative routes;
determine, responsive to said first set of data flows, a first standard deviation, wherein said first standard deviation describes a distribution of said first set of data flows across links in said communication network;
determine a second set of data flows between end nodes attached to said communication network, wherein said second set of data flows is determined response to a second one of said alternative routes;
determine, responsive to said second set of data flows, a second standard deviation, wherein said second standard deviation describes a distribution of said second set of data flows across links in said communication network;
compare said first standard deviation and said second standard deviation;
select said first one of said alternative routes in the event that said first standard deviation is lower than said second standard deviation: and
select said second one of said alternative routes in the event that said second standard deviation is lower than said first standard deviation; and
deliver a forwarding table to each forwarding device in said communication network, the forwarding tables containing no alternative routes and causing the forwarding devices to implement the final enabled routing.

6. The system of claim 5, wherein said performance metric is fault tolerance.

7. The system of claim 6, wherein said routing logic is further operable to:
determine a first difference measure, said first difference measure reflecting a number of differing links between a first pair of said alternative routes;
determine a second difference measure, said second difference measure reflecting a number of differing links between a second pair of said alternative routes; compare said first difference measure and said second difference measure;
determine a selected pair of said alternative routes, wherein said selected pair of said alternative routes comprises said first pair of said alternative routes in the event said first difference measure is greater than said second difference measure, and wherein said selected pair of alternative routes comprises said second pair of alternative routes in the event said second difference measure is greater than said first difference measure; and
designate a first one of said selected pair of said alternative routes as an enabled route, and designating a second one of said selected pair of said alternative routes as a backup route.

8. The system of claim 7, wherein said routing logic is further operable to:
detect a failure of said enabled route; and
replace said enabled route with said backup route.

9. The system of claim 5, wherein said routing logic comprises at least one digital logic circuit.

10. The system of claim 5, wherein said routing logic comprises program code loaded into a memory of a computer system.

11. A system for selecting routing information to be provided to forwarding devices in a communication network, comprising:

means for obtaining routing information describing a plurality of alternative routes between forwarding devices of said communication network from a single routing table, wherein said plurality of alternative routes is deadlock free;
means for selecting a final enabled routing from said plurality of alternative routes, wherein said selecting optimizes a performance metric, wherein said performance metric is network capacity, wherein means for selecting the final enabled routing further comprises:
means for determining a first set of data flows between end nodes attached to said communication network, wherein said first set of data flows is determined, at least in part, responsive to a first one of said alternative routes;
means for determining, responsive to said first set of data flows, a first standard deviation, wherein said first standard deviation describes a distribution of said first set of data flows across links in said communication network;
means for determining a second set of data flows between end nodes attached to said communication network, wherein said second set of data flows is determined response to a second one of said alternative routes;
means for determining, responsive to said second set of data flows, a second standard deviation, wherein said second standard deviation describes a distribution of said second set of data flows across links in said communication network;
means for comparing said first standard deviation and said second standard deviation:
means for selecting said first one of said alternative routes in the event that said first standard deviation is lower than said second standard deviation; and
means for selecting said second one of said alternative routes in the event that said second standard deviation is lower than said first standard deviation; and
means for delivering a forwarding table to each forwarding device in said communication network, the forwarding tables containing no alternative routes and causing the forwarding devices to implement the final enabled routing.

12. A computer program product including a computer readable medium, said computer readable medium having a computer program stored thereon, said computer program for selecting routing information for distribution to at least one forwarding device, said computer program comprising:
program code for obtaining information describing a plurality of alternative routes between forwarding devices of said communication network from a single routing table, wherein said plurality of alternative routes is deadlock free;
program code for selecting a final enabled routing from said plurality of alternative routes, wherein said selecting optimizes a performance metric, wherein said performance metric is network capacity, wherein program code for selecting the final enabled routing further comprises:
program code for determining a first set of data flows between end nodes attached to said communication network, wherein said first set of data flows is determined, at least in part, responsive to a first one of said alternative routes;
program code for determining, responsive to said first set of data flows, a first standard deviation, wherein said first standard deviation describes a distribution of said first set of data flows across links in said communication network;

program code for determining a second set of data flows between end nodes attached to said communication network, wherein said second set of data flows is determined response to a second one of said alternative routes;

program code for determining, responsive to said second set of data flows, a second standard deviation, wherein said second standard deviation describes a distribution of said second set of data flows across links in said communication network;

program code for comparing said first standard deviation and said second standard deviation;

program code for selecting said first one of said alternative routes in the event that said first standard deviation is lower than said second standard deviation; and program code for selecting said second one of said alternative routes in the event that said second standard deviation is lower than said first standard deviation; and program code for delivering said a forwarding table to each forwarding device in said communication network, the forwarding tables containing no alternative routes and causing the forwarding devices to implement the final enabled routing.

* * * * *